United States Patent
Rini et al.

(10) Patent No.: US 9,156,356 B2
(45) Date of Patent: Oct. 13, 2015

(54) INTELLIGENT BATTERY DISCONNECT

(75) Inventors: Guy T. Rini, Winchester, VA (US);
Charles J. Groeller, Orefield, PA (US);
Dale B. Henningson, Manti, UT (US)

(73) Assignee: GTR DEVELOPMENT LLC,
Winchester, VA (US)

( * ) Notice: Subject to any disclaimer, the term of this patent is extended or adjusted under 35 U.S.C. 154(b) by 858 days.

(21) Appl. No.: 13/368,409

(22) Filed: Feb. 8, 2012

(65) Prior Publication Data
US 2013/0200690 A1    Aug. 8, 2013

(51) Int. Cl.
| | |
|---|---|
| H02H 7/18 | (2006.01) |
| B60L 3/00 | (2006.01) |
| H02J 7/00 | (2006.01) |
| H02J 7/16 | (2006.01) |
| B60L 3/04 | (2006.01) |

(52) U.S. Cl.
CPC .............. *B60L 3/0046* (2013.01); *B60L 3/0007* (2013.01); *B60L 3/04* (2013.01); *H02J 7/0031* (2013.01); *H02J 7/166* (2013.01); *H02J 2007/004* (2013.01); *H02J 2007/0037* (2013.01); *H02J 2007/0039* (2013.01); *Y02T 10/7005* (2013.01); *Y02T 90/16* (2013.01)

(58) Field of Classification Search
USPC ........................................................ 307/10.7
See application file for complete search history.

(56) References Cited

U.S. PATENT DOCUMENTS

| | | | |
|---|---|---|---|
| 5,089,762 A | 2/1992 | Sloan | |
| 5,170,151 A | 12/1992 | Hochstein | |
| 5,332,958 A | 7/1994 | Sloan | |
| 6,037,749 A * | 3/2000 | Parsonage | 320/132 |
| 6,150,793 A * | 11/2000 | Lesesky et al. | 320/104 |
| 6,424,511 B1 | 7/2002 | Levinas | |
| 6,625,553 B1 | 9/2003 | Modgil | |
| 6,629,050 B2 | 9/2003 | Modgil | |
| 6,646,845 B1 | 11/2003 | Turner et al. | |
| 6,836,094 B1 | 12/2004 | Bender | |
| 6,924,621 B2 | 8/2005 | Jabaji et al. | |
| 7,319,203 B1 | 1/2008 | Briggs et al. | |
| 7,460,344 B2 | 12/2008 | Hastings et al. | |
| 7,612,524 B2 | 11/2009 | Howell et al. | |
| 7,821,227 B2 | 10/2010 | Howell et al. | |
| 2004/0041682 A1 | 3/2004 | Pasha et al. | |
| 2008/0079389 A1* | 4/2008 | Howell et al. | 320/104 |
| 2009/0147427 A1 | 6/2009 | Levinas et al. | |
| 2010/0320021 A1* | 12/2010 | Rini et al. | 180/271 |
| 2011/0210605 A1 | 9/2011 | Duan et al. | |

* cited by examiner

*Primary Examiner* — Jared Fureman
*Assistant Examiner* — Duc M Pham
(74) *Attorney, Agent, or Firm* — Anova Law Group, PLLC

(57) ABSTRACT

The present invention is an electronically controlled battery contactor that opens (disconnects) or closes (connects) the battery circuit from the other parts of a motor vehicle electrical system based on measured or sensed data derived from monitoring the electrical system, communicating with other on-board control units, and pre-programmed requirements specific to the vehicle operation. The primary functions are to protect the battery from excessive current drain when the vehicle is parked, protect against short circuits across the main electrical feed, and provide emergency disconnect for vehicle impact, rollover or sensed thermal events. A programmed delay function controls the opening of the contactor in conjunction with other electronic control units that may require electrical power for a period of time after vehicle shutdown. A master electrical disconnect switch is provided for manual override for servicing the vehicle or during an emergency.

10 Claims, 1 Drawing Sheet

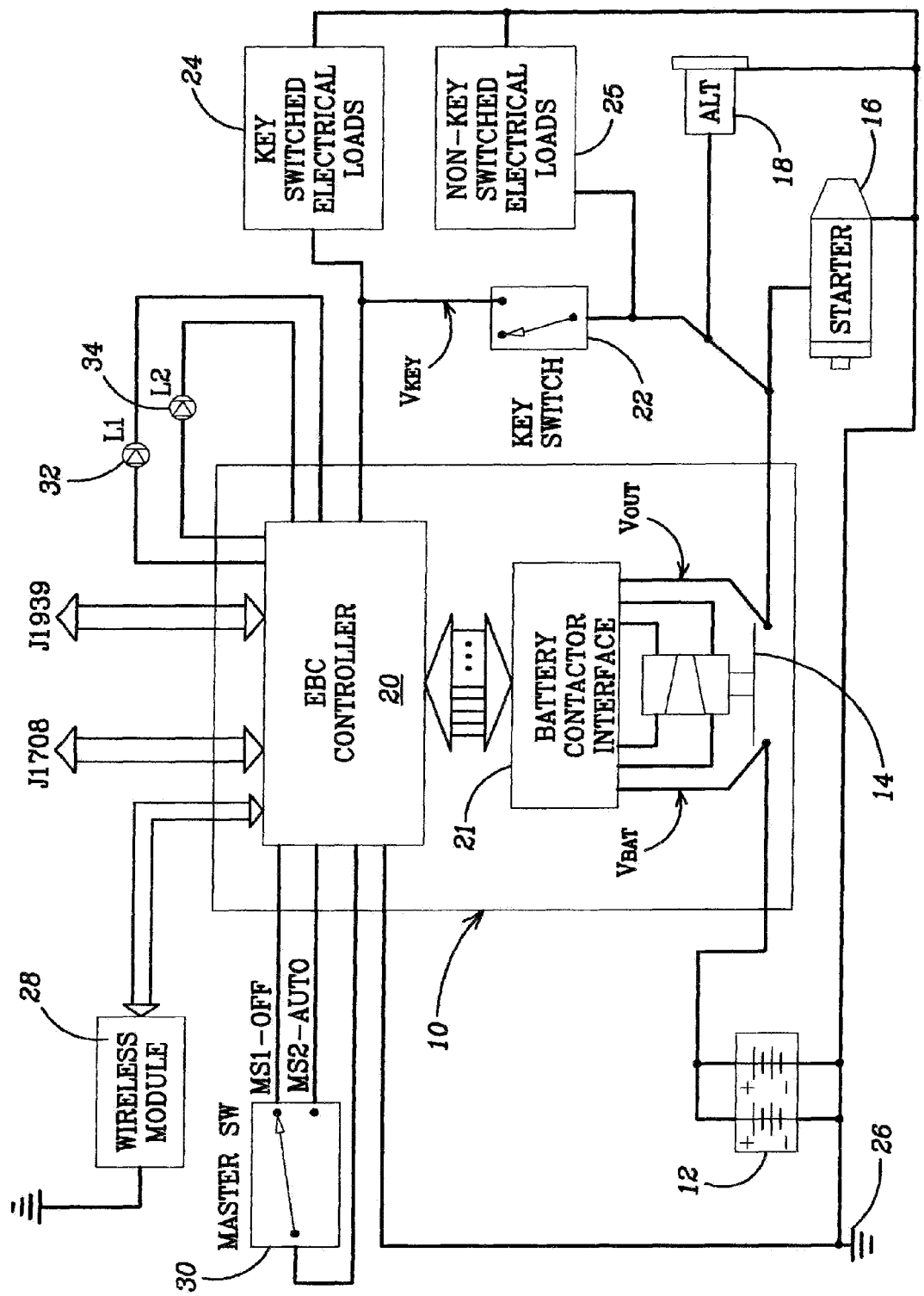

INTELLIGENT BATTERY DISCONNECT

CROSS-REFERENCES TO RELATED APPLICATIONS

This application claims the priority of U.S. patent application Ser. No. 12/803,247, titled Vehicle Fire Prevention and Detection System, filed on Jun. 22, 2010, and issued as U.S. Pat. No. 8,307,934 on Nov. 13, 2012.

BACKGROUND OF THE INVENTION

The present invention is designed for vehicle applications where electrical power may or may not be routinely disconnected at the time of vehicle shutdown. The apparatus provides an intelligent monitoring of the electrical usage of a vehicle, particularly after engine shutdown, so that ample battery energy can be preserved to restart the vehicle at a later time. The apparatus can also provide catastrophic event monitoring for the vehicle to disconnect the battery or batteries in the event of a fire or vehicular accident.

Large commercial motor vehicles, such as heavy trucks that are powered by diesel engines, may be parked for extended periods of time. If the engine is permitted to remain operating after the vehicle is parked, the alternator should be sufficient to keep the vehicle's battery charged. However, if the engine is turned off, either intentionally by the operator, or automatically by a device such as an idle shut-down timer, while a number of electrical devices and circuits remain operational on the vehicle, the battery will begin to drain through those circuits. For example, an ignition switch will typically remain in the "on" position after an idle shut-down timer has timed out and the engine is shut down. Any circuit or electrical device that is connected through the ignition switch, which electrical device may have been left "on," will continue to draw current and deplete the battery.

The vehicle battery must be able to provide sufficient cranking power to start the vehicle engine after a shutdown. A battery of a large vehicle typically comprises multiple storage batteries arranged in a parallel circuit array to provide greater starting current. If the battery is permitted to drain to the point where it cannot deliver the large cranking power necessary for restarting the engine, the vehicle cannot be operated. Due to the fact that a large vehicle, such as a heavy truck, may be parked for an extended time, it is appropriate to guard against the possibility that its battery will be drained to the point that will not permit the engine to be started or cranked for failure to turn off all electrical devices and disconnect the battery from the vehicle's electrical circuits. This type of circumstance may also exist in medium duty trucks used for inter- and intra-city deliveries.

It is known to place a disconnect switch in the vehicle electrical circuit between the battery and the remainder of the vehicle's electrical system for use in disconnecting the battery to prevent battery current draw that, if allowed to continue for an extended time could drain the battery to the point that the engine could not be restarted or cranked without an external source of electrical power. A battery disconnect device is typically a mechanical rotary type switch or an electro-mechanical device, such as a latching relay, which is capable of carrying relatively heavy current loads, and requires no power to remain open or closed. The battery disconnect device may be activated manually or actuated in response to conditions detected on the vehicle such as an idle shutdown timer, an accident detection system (possibly coupled to the airbag deployment circuit), a battery voltage monitoring circuit, etc.

Some examples of these automated disconnect circuits are as follows. In U.S. Pat. No. 7,460,344 [Hastings, et al.] a battery disconnect circuit is described that operates in response to a manual on/off signal or to automatically sense an arc fault, overload condition, or short circuit to disconnect the batteries from the electrical load. Another example is U.S. Pat. No. 7,612,524 [Howell, et al.] that describes a series of solid state switches mounted in parallel between the battery and the electrical load of the vehicle. The switches are associated with different power sources, i.e., direct battery fed, accessory fed and ignition fed, and are controlled by a microprocessor that uses vehicle sensors, data links, etc. to automatically control the electrical power to the various loads. These systems fail to include the vehicle alternator, starter motor and key switch from the battery as part of the control process. Their purpose is to monitor, control and protect the vehicle electrical loads. The earlier devices protected the electrical wiring and loads but failed to disconnect the battery from the alternator and starter circuits.

In some instances, solid-state devices have replaced the analog control circuitry of electro-mechanical relays. But solid-state devices have not fully replaced the electro-mechanical devices in the automotive industry and electro-mechanical devices continue to enjoy significant usage in that industry. However, none of the earlier known devices can provide precise, sensor driven control over the battery disconnect switch with the increasing use of on-board computing devices programmed to control the overall functioning of the vehicle, its engine and associated electro-mechanical and electrical subsystems.

It is one object of the present invention to monitor the electrical system of a heavy vehicle to recognize "key switch" closure while the battery is disconnected from the electrical loads. It is another object of the invention to automatically connect the battery when "key switch" closure is detected. It is also an object of the invention to continually monitor the status of the vehicle electrical system, i.e., charge, discharge, engine running, fault conditions, etc., and take appropriate actions based upon the sensed conditions. It is yet another object to electronically log and provide to the operator of the vehicle electrical system health information, e.g., charging and start system condition, wiring deterioration, as well as diagnostics and prognostics information. It is yet another object to disconnect the battery, protecting the electrical system for certain conditions; e.g. low voltage disconnect, over charge protection, short circuit protection, delayed battery disconnect after engine shutdown.

It is an additional object of the present invention to monitor onboard data from other vehicle monitoring systems to assist in fire prevention and accident detection. In monitoring the vehicle sensors the present invention responds to rollover detection or severe accident occurrence by automatically disconnecting the battery. It is a still further object of the invention to provide a manual override master switch that disables the present invention monitoring and opens the battery contactor disabling the entire vehicle electrical system. It is yet another object of the invention to provide an alarm, audible, visual, or both, to the vehicle operator immediately prior to battery disconnect either in response to a detected emergency, a sensed fault, or in response to a normal shutdown. Finally, it is an object of the present invention to provide a programmable time delay to allow for the transfer of data from on-board data compilers and storage devices to download their information prior to battery disconnect.

Other objects will appear hereinafter.

SUMMARY OF THE INVENTION

The Intelligent Battery Disconnect system of the present invention provides electronic control of a battery contactor that is arranged in series between the vehicle battery and the vehicle electrical system. The IBD disconnects the battery from the electrical system when the engine is off and certain criteria are met. This prevents current drain and preserves battery energy for the next engine start cycle. The battery contactor is closed whenever the vehicle key switch is turned to the "on" position allowing normal vehicle electrical functions to operate including the engine start function.

The IBD monitors various electrical system voltages in order to determine normal operating modes and/or fault modes. Each set of voltage readings is used to estimate electric current and resistance of circuits, enabling the system to determine battery state of charge, and detect faults with the battery, starting system, and charging system. The battery contactor is opened after the key switch is turned "off" based on programmed logic for a time delay in accordance with other vehicle ECU or manufacturer's requirements. The battery contactor will also open in the event of a defined fault which is detected.

The IBD operation is transparent to the operator under normal operation. A master switch is optionally provided for a manual override by the operator for an entire electrical system shutdown. A system status and fault lamps are provided with programmed logic for visual display to the operator of the system status.

The Electronic Battery Contactor [EBC] Controller provides continual monitoring of various vehicle voltages and current levels to determine the precise current status of certain electrical apparatus of the vehicle. Each of the sensed or detected voltage and current levels provide information utilized by the EBC Controller to monitor the charge of the battery system, the engine start initiate command of the key switch, the controlling of the closing and opening of the battery contactor in the main electrical bus, the automatic or manual control over the electrical system through the status of the Master Switch, and the ongoing status checks of the battery charging system, the battery system charge, and the sensing of current and voltage patterns.

The IBD can interface through a communications bus with other data collection devices on the vehicle to open the contactor in response to a variety of events such as, but not limited to; crash impact, rollover, smoke in the drive compartment, fire in the engine compartment, etc., and shutdown the electrical systems in response to such incidents.

BRIEF DESCRIPTION OF THE DRAWING

For the purpose of illustrating the invention, there is shown in the drawing forms which are presently preferred; it being understood, however, that the invention is not limited to the precise arrangements and instrumentalities shown.

FIG. 1 shows a schematic diagram of the control apparatus for managing the electrical system for a land vehicle engine and its electrical system and controlling battery disconnect upon detection of preset parameters.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawing.

Referring now to the drawings in detail, where like numerals refer to like parts or elements, there is shown in FIG. 1 the Intelligent Battery Disconnect 10, which may also be referred to as the IBD, of the present invention. The IBD 10 is comprised of an Electronic Battery Contactor [EBC] Controller 20 and a battery contactor 14. A heavy vehicle, such as a heavy truck or tractor for pulling one or more trailers, or a medium duty vehicle, has a battery or battery bank 12 as shown in FIG. 1. The positive terminal(s) of the battery 12 are connected to the input terminal of the Battery Contactor 14, which input terminal is monitored for voltage detected [$V_{BAT}$] by the Electronic Battery Contactor [EBC] Controller 20 through the Battery Contactor Interface 21. The output terminal of the battery contactor 14 [$V_{OUT}$] is also monitored by the EBC Controller 20 through the Battery Contactor Interface 21. The output terminal of the battery contactor 14 is connected to the vehicle starter 16, the vehicle alternator 18, the non-key switched electrical loads 25, and to the key or ignition switch 22. In this manner the EBC Controller 20 monitors the voltage $V_{OUT}$ to the starter 16, the alternator 18, the non-key switched electrical loads 25, and the key switch 22. The EBC Controller 20 also monitors the voltage $V_{KEY}$ at the output of the key switch 22 to determine the electrical system operating mode. Those vehicle electrical apparatus that are controlled by the position of the key switch 22, the key-switched electrical loads 24, are also connected to the output terminal of the key switch 22. The vehicle key-switched electrical loads 24, the non-key switched electrical loads 25, the starter 16, and alternator 18 are all connected to the vehicle or vehicle chassis ground 26, which vehicle ground 26 is also connected to the negative terminal of the battery 12. The EBC Controller 20 is also connected to the vehicle ground 26 to establish a baseline voltage level for the vehicle.

In this circuit configuration, the battery contactor 14 is positioned between the battery 12 and all other electrical apparatus of the vehicle, i.e., the vehicle starter 16 and the vehicle alternator 18, as well as the key switch 22 and the various electrical loads 24 controlled by the key switch 22 and the non-key switched electrical loads 25 that are independent of the key switch 22. This is unlike conventional battery contactors that are only placed between the battery bank of a vehicle and the vehicle electrical loads, but do not connect or disconnect the starter or alternator when opening or closing its contactor.

The key switch 22 may be a standard ignition switch requiring the insertion of a physical key to operate the switch or an electronic equivalent that requires only a push button switch and a paired "key fob" in close proximity for operation. It should also be noted that the non-key switched electrical loads 25 do not include those electrical devices and systems that are necessary or required for the same and secure operation of the vehicle. These systems include the hazard warning system lamps, vehicle tracking and locator systems using a global positioning system, and any other electrical system designated as such by the owner/operator of the vehicle.

A Master Switch 30 may be connected through the EBC Controller 20 which is capable of shutting down the entire vehicle electrical system in accordance with the EBC Controller 20. The Master Switch 30 is provided to enable an operator the manual override of the entire vehicle electrical system. The Master Switch 30 is provided with two positions: MS1—OFF and MS2—AUTO. Moving the Master Switch 30 to the MS1—OFF position overrides all other inputs and control functions so that the entire vehicle electrical system is manually shut down. The battery contactor 14 will remain open until the Master Switch 30 is moved to the MS2—AUTO position to be reengaged, giving control of the vehicle electrical systems back to the EBC Controller 20. With the Master Switch 30 in the MS2—AUTO position, the switch is considered to be in the CLOSED position and normal operation of the vehicle electrical system under the control of the EBC Controller 20 will continue.

The OFF and AUTO positions of the Master Switch 30 are intrinsically opposite in state. They cannot both be in the "high" state (LOGIC "1") or in the "low" state (LOGIC "0") at the same time. If both are read by the EBC Controller 20 as being in the same state, then a fault condition is present and the battery contactor 14 will open or remain open until the fault is repaired.

The EBC Controller 20 provides controlled signaling to vehicle operation monitoring lamps 32, 34 that are provided for viewing by the vehicle operator on the dash panel or similar location. This visual feedback for the operator is provided by the electrical system status lamp 32 and by the fault lamp 34. The Status Lamp 32 is preferred to be green in color and when illuminated, or ON, indicates that the MS2—AUTO condition of the Master Switch 30 is set. If the Status Lamp 32 is not illuminated, then the MS1—OFF condition of Master Switch 30 is set and the operator must exit the vehicle and manually change the position of the Master Switch 30 to the CLOSED position to allow for the proper operation of the vehicle under the control of the EBC Controller 20. The Fault Lamp 34 is preferred to be red in color and when illuminated, or ON, indicates a fault or failure within the electrical system. If Fault Lamp 34 is not illuminated, then normal operation can be expected. The Status and Fault Lamps 32, 34 act in tandem and a chart of their illumination with the battery contactor 14 in either the OPEN or CLOSED positions is presented in CHART 1 below.

CHART 1

| Contactor Switch | Green Lamp | Red Lamp | Description of Condition |
|---|---|---|---|
| Closed | On | Off | Normal operation, battery power available |
| Open | Blink | Off | Normal operation, battery disconnected |
| Closed | Off | On | Soft failure, battery power available, some functions disabled |
| Open | Off | On | Electrical system failure, battery disconnected |

In this way the vehicle operator is informed of the present status of the electrical system of the vehicle.

The contactor switch 14 is continually monitored and controlled by the EBC Controller 20. The Controller 20 monitors the current flow through the contactor 14 through the current sense circuit within the contactor 14 by reading the current sensed output. The EBC Controller 20 also controls the coil in the contactor 14 to connect the battery 12 to the other elements of the vehicle electrical system. When closing the contactor 14 the EBC Controller 20 does so upon sensing when the key switch 22 is closed and the Master Switch 30 is set in the MS2—AUTO position for automatic control of the vehicle electrical system by the EBC Controller 20.

The function of the EBC Controller 20 is to continually monitor inputs, determine operating mode and perform electrical system parameter range checks to identify when a specific parameter is within or beyond an allowable range. The inputs from the Master Switch 30, i.e., MS1—OFF and MS2—AUTO are digital inputs providing fixed voltage (LOGIC) values to the EBC Controller 20 for purposes of control and visual status/fault display. The EBC Controller 20 also monitors voltage level inputs (analog values) for $V_{BAT}$, $V_{OUT}$ and $V_{KEY}$. The relationship of these three voltages as a function of time determines the operating mode for the vehicle electrical system. The electrical system operating modes are:

1. KEY OFF—engine off with Battery Contactor CLOSED;
2. KEY OFF—engine off with Battery Contactor OPEN;
3. KEY ON—engine operating;
4. KEY ON—engine off; and
5. Battery Contactor CLOSED with Starter engaged.

An important part of the invention is the key switch 22 status monitoring function. With the battery contactor open EBC Controller 20 periodically injects an electrical pulse through the $V_{OUT}$ terminal while monitoring the $V_{KEY}$ input. Key closure is detected when the electrical pulse is present at the $V_{KEY}$ input.

The IBD 10 utilizes the relationships of voltage waveforms to establish the health and operating modes of the vehicle electrical system. FIG. 1 shows the voltages monitored by the EBC Controller 20 as $V_{BAT}$ (current battery voltage), $V_{OUT}$ (output of battery contactor) and $V_{KEY}$ (voltage at key switch output). The instantaneous and average value of these voltages, historical data and fault threshold values are used to control the Battery Contactor 14.

Operating Modes

1. KEY OFF—Engine Off with Battery Contactor CLOSED

This operating mode is initiated by the operator turning the key switch 22 to OFF [$V_{KEY}$=0]. This action opens the circuit to key switched electrical loads 24 which subsequently shuts down the engine and alternator 18. The EBC Controller 20 initiates a timeout function before opening the battery contactor 14. The timeout is based on programmed logic in accordance with the requirements of other vehicle ECU or the vehicle manufacturer's requirements. For example exhaust after-treatment systems might require electrical power for several minutes after the engine is shut down to insure "diesel exhaust fluid" is properly drained back to the storage tank. The timeout can also include communication with electronic control units via the SAE J1939 cable or through wireless interface. During this operating mode $V_{BAT}$, $V_{OUT}$ and $V_{KEY}$ voltages are monitored to insure that the detected voltages are within allowable limits. The Battery Contactor 14 is opened by a control signal from the EBC Controller 20 following the completion of the timeout and electrical system shut down is complete.

2. KEY OFF—Engine Off with Battery Contactor OPEN

This is the normal operating mode for a parked vehicle that will occur after the timeout for shut down. The Battery Contactor 14 is OPEN [$V_{OUT}$=0] such that the entire electrical system is disabled. The EBC Controller 20 will periodically inject an electrical pulse through the $V_{OUT}$ terminal of the Battery Contactor 14 while monitoring $V_{KEY}$ at the key switch 22. Key switch 22 closure is detected by the EBC Controller 20 upon the occurrence of a voltage signal being present at $V_{KEY}$ and within the allowable range. During this operating mode $V_{BAT}$, $V_{OUT}$ and $V_{KEY}$ voltages are also monitored to insure that the detected voltages are within allowable limits.

3. KEY ON—Engine Operating

This is a normal operating mode after the engine starts. The waveform at $V_{KEY}$ shows the presence of repetitive inductive spikes that signify the firing of electronic fuel injectors. The waveform also has the signature of the alternator, the ripple from full wave rectification and the raised voltage level above normal battery voltage, when properly working. During this operating mode $V_{BAT}$, $V_{OUT}$ and $V_{KEY}$ voltages are monitored to detect charging current going to the battery 12, and to detect the alternator 18 output voltage and voltage values that are outside the allowable limits. The EBC Controller 20 monitors the system to detect whether the alternator 18 is providing an output voltage, whether the electrical system is overcharging the battery 12, or any short circuits exist by detecting voltage levels outside the allowable limits.

4. KEY ON—Engine Off

This is a mode of operation while the vehicle is stationary with the engine off. The waveforms are relatively constant (dc voltage) although pulsing from hazard warning lamps or repetitive circuit breaker cycles can be seen. The voltage differences reflect current drain of the battery 12. These values are all relatively low except for short circuit currents.

5. Battery Contactor CLOSED with Starter Engaged

This is the operating mode that is present for only a short duration when the starter 16 is engaged. The starter 16 is initiated by the operator switching the key switch 22 into the vehicle start position. This is a spring-loaded position of the key switch 22 such that the switch will return to the ON position when the engine starts and released by the operator. The waveforms during the start function have a unique signature characterized by very high currents that diminish with cranking speed and voltage levels lower than normal. During this mode the EBC Controller 20 can recognize changes in the profiles that result from component degradation or wear, e.g., defective battery 12, corrosion of power terminals, or defective starter 16. During this mode the EBC Controller 20 monitors the time interval for cranking the engine. The Battery Contactor 14 can be opened (optional function) after a defined time period (e.g., 30 seconds) to protect electrical components and allow the battery voltage to recover. Following the defined time period the Battery Contactor 14 is again closed.

Additional operating modes beyond the five operating modes enumerated above are also contemplated by the invention. The absence of an alternator 18 output voltage, or a distorted or waveform characteristic due to certain fail modes are evidence of alternator performance deterioration or failure. Other examples of fail modes are overcharging of battery 12, open circuit voltage to the battery 12, low state of charge threshold or low voltage during cranking indicating a fail mode for the battery 12 as $V_{BAT}$ is not detected to be within the allowable range by the EBC Controller 20. These conditions indicate corrosion of battery terminals or a high internal resistance of the battery 12 which are indicative of battery failure. The prognostic software contained in the EBC Controller 20 is designed to recognize vehicle electrical system operation (fail modes) outside of normal operating modes due to component failure, degradation, corrosion, wear or other exterior factors adversely affecting normal operation of the vehicle. For each of the fail modes, the detected conditions are date stamped and recorded in a memory storage location in the EBC Controller 20.

Normal operation of the IBD 10 enables the EBC Controller 20 to sense and control the functioning of the various circuit elements that form part of the heavy vehicle electrical configuration. The programmatic control first queries whether the battery contactor 14 is OPEN or CLOSED. The program steps are as follows:

Executive Routine
1. If Battery Contactor is Open then
   Go To Contactor Open Routine
   Else Go To Contactor Closed Routine If the battery contactor 14 is OPEN, then a series of steps are undertaken to check the status of the electrical devices and to close the contactor. The program steps are as follows:

Contactor Open Routine
1. If Battery Contactor is "Open" then
   1.1 Start Exec_Timer (for predetermined time period)
   1.2 Run Master Switch Routine An internal timer is set to a predetermined status check time, e.g., 200 ms, and the Master Switch 30 status is checked. Each of the input switch states MS1, MS2 is checked. If MS1=1 and MS2=0 then the Master Switch 30 is OPEN and the switch must be manually closed by the operator. If MS1=0 and MS2=1 then the Master Switch 30 is closed and the sensed automatic switch operation indicates that the switch is closed and the status check can continue. In the event that MS1=1 and MS2=1 or MS1=0 and MS2=0 then a fault has occurred and the Master Switch must be manually checked by the operator. The "status" and "fault" condition will be displayed on Lamp L1, 32, and Lamp L2, 34, respectively, as described above. The program steps for the Master Switch Routine are as follows:

Master Switch Routine

| | | |
|---|---|---|
| 1. | Input MS1 and MS2 | |
| 2. | If MS1 = 1 and MS2 = 0 then | Master Switch Open |
| | Reset MS_Close = 0 | |
| | Reset MS_Toggle = 0 | |
| 3. | If MS1 = 0 and MS2 = 1 then | Master Switch Closed |
| | Set MS_Close = 1 | |
| | If MS_Toggle = 0 then | |
| | Set MS_Toggle = 1 | Switch "transition" to closed |
| | Else MS_Close = 0 | |
| 4. | If MS1 = 1 and MS2 = 1 or | |
| | MS1 = 0 and MS2 = 0 | |
| | Then set MS_Fault = 1 | Master Switch fault |
| | Else MS_Fault = 0 | |
| 5. | End of Master Switch Routine | Return to Contactor Open Routine |

The next routine performs the key switch monitoring function. The purpose of the routine is to recognize when the operator closes the key switch 22. Under this condition contactor 14 is open and there is no power to the vehicle electrical system, hence the key switch is not connected to the battery. Only the EBC Controller 20 is connected to the battery through the $V_{BAT}$ input passing through the Contactor Interface 21. EBC Controller 20 periodically injects an electrical pulse through the $V_{OUT}$ terminal while monitoring the $V_{KEY}$ input. Key switch closure is detected when the electrical pulse is present at the $V_{KEY}$ input.

Key Switch Monitor Routine

| | |
|---|---|
| 1. Output low energy electrical test pulse at $V_{OUT}$ | |
| 2. Wait (for predetermined time period) | allow for capacitance delay |
| 3. Check input voltage at $V_{KEY}$ | |
| 4. If pulse is present at $V_{KEY}$ | Key Switch closed |

The Controller 20 next checks the $V_{BAT}$, the voltage available from the battery 12. The Controller 20 samples the voltage at $V_{BAT}$ and calculates an average voltage for $V_{BAT}$ over at least three cycles. Once the average voltage is obtained, a check is made to determine whether there exists a low battery or an overcharge condition. The average voltage obtained is checked against a first constant (low battery voltage) and if the average voltage is less than the constant a low battery threshold is determined. If the average voltage is greater than a second constant (high battery voltage), then an overcharge condition exists. In either instance a fault will be detected and indicated to the operator. If the value of $V_{BAT}$ is normal, then the key switch status check is resumed. The program steps for the Input Voltages Routine are as follows:

Input Voltages Routine
1. VBat Voltage Routine

| | | |
|---|---|---|
| 1.1 | Set Vbat Voltage to voltage @ $V_{BAT}$ | input battery voltage |
| 1.2 | Average Vbat | use several cycle moving average |
| 1.3 | If Vbat < (low battery voltage) then<br>Set VBat_Low = 1<br>Else VBat_Low = 0 | low battery threshold |
| 1.4 | If Vbat > (high battery voltage) then<br>Set VBat_Hi = 1<br>Else VBat_Hi = 0 | overcharge condition |
| 1.5 | Set VBat_Fault | |

The Controller 20 next measures the voltage at $V_{BAT}$. The program steps are as follows:
2. Contactor Output Voltage Routine

| | | |
|---|---|---|
| 2.1 | Set VOutVoltage = voltage @ $V_{OUT}$ | voltage at $V_{OUT}$ |
| 2.2 | Average VOut | use several cycle moving average |
| 2.3 | If VOut < (low voltage output) then<br>Set V_Out_Low = 1<br>Else reset V_Out_Low = 0 | start mode or fault |
| 2.4 | If VOut < (VBat – 1.0) then<br>Set V_Out_Fault<br>Else Reset V_Out_Fault | |

The Controller 20 next measures the voltage at $V_{KEY}$. The program steps are as follows:
3. VKey Voltage Routine

| | | |
|---|---|---|
| 3.1 | Set VKeyVoltage to voltage @ $V_{KEY}$ | voltage at output of key switch |
| 3.2 | Average VKey | use several cycle moving average |
| 3.3 | If VKey > (key switch voltage output) then<br>Set V_Key_On = 1 | key switch on; voltage present |
| | Else V_Key_On = 0 | key switch off or fault |
| 3.4 | If VKey < (Vout – 2.0) then<br>Set V_Key_Low = 1<br>Else V_Key_Low = 0 | |
| 3.5 | Set V_Key_Fault | |

When the voltage sampling is completed the next steps in the Input Voltages Routine are as follows:
    4. If ($V_{OUT}-V_{KEY}$)<(predetermined constant) then
    4.1 Set V_Key_On=1
    4.2 Else V_Key_On=0
The Controller 20 next measures the voltage at $V_{OUT}$ against the voltage sensed at the output of the key switch 22, $V_{KEY}$.

The Controller 20 senses the voltage at the output terminal of key switch 22 by averaging the voltage over three cycles to determine an average $V_{KEY}$. If the difference between these two voltage values is less than a predetermined value then the key switch 22 is determined to be ON, otherwise the key switch 22 is determined to be OFF.

In order for the Controller 20 to sense and determine the $V_{OUT}$ and $V_{KEY}$ voltage values the following is done. The voltage is sensed on the input contactor output with that voltage value being considered as $V_{OUT}$. An average of this voltage value is taken over three cycles and checked against a constant. If $V_{OUT}$ is equal to greater than the constant then the status check continues. If $V_{OUT}$ is less than the constant then the $V_{OUT}$ voltage level is not acceptable and a fault check is undertaken. $V_{OUT}$ is compared to $V_{BAT}$ decreased by a constant value. If $V_{OUT}$ is less than the calculated $V_{BAT}$ voltage value, then a fault is detected.

$V_{KEY}$ is determined in a similar fashion. The voltage is sensed over three cycles at the output terminal for the key switch 22. If the averaged voltage value for $V_{KEY}$ is greater than a constant value, then the key switch 22 is determined to be ON. If the averaged voltage value for $V_{KEY}$ is less than the constant, then key switch 22 is OFF, or a fault condition exists. To determine whether a fault exists, the Controller 20 determines whether $V_{KEY}$ is less than the calculated value of $V_{OUT}$ less a constant. If $V_{KEY}$ is greater than the calculated value then no fault exists, but if $V_{KEY}$ is less than the calculated value, then a fault has occurred.

The sensing, calculations, and detected status of the various voltages by the EBC Controller 20 need to be communicated to the operator. A fault detection process is undertaken to accumulate the faults, if any were detected, and communicate that to the operator. If the fault status for any of the detected voltage or current sensing checks resulted in a fault detection, or if the Master Switch 30 was detected to be MS1=1, then a fault condition is determined and maintained until cleared. With the battery contactor OPEN, and no fault, the EBC Controller 20 then sets Lamp L1, 32, to PULSE or blink. If the battery contactor 14 is sensed as CLOSED, then the Lamp L1, 32, is set to ON. If a fault has been detected the Lamp L2, 34, is set to ON. Otherwise, if no fault is detected, the Lamp L2, 34, is set to OFF. The LED Lamps L1 and L2, 32, 34, are initiated to display the values set by the Controller 20 to visually indicate to the operator the status of the electrical components of the vehicle. The program steps following the call of the Fault Status Routine by the Contactor Open Routine are as follows:

| | |
|---|---|
| Fault Status Routine | Check for anomalies |
| 1. If V_Out_Fault = 1<br>   Or I_Out_Fault = 1<br>   Or MS_Fault = 1 then<br>      Fault = 1<br>      Else Fault = 0 | Fault Flag ON |
| 2. If Battery Contactor = 1<br>   And Fault = 0 then<br>      Set GRN_On = 1<br>      If Battery Contactor = 1<br>      And Fault = 0<br>      Else GRN_On = 0 | Contactor CLOSED w/o fault |
| 3. If Battery Contactor = 0<br>   And Fault = 0 then<br>      Set GRN_Pulse = 1<br>      Else GRN_Pulse = 0 | Contactor OPEN w/o fault |
| 4. If Fault =1 then<br>   Set RED_Fault = 1<br>   Else Red_Fault = 0 | Fault conditions |

The next step is to illuminate the status lamps by calling the LED Status Routine that sends output signals to the lamps in accordance with the Fault detection.

Once the status checking is completed, and the contactor 14 has been determined to be open, the EBC Controller 20 instructs the battery contactor 14 to close by energizing the coil close contacts to close the contactor 14 so that current flows from the battery 12 to the starter 16, alternator 18 and key switch 22. With the contactor 14 in the CLOSED position, or if the contactor 14 is sensed by the EBC Controller 20 to be in the CLOSED position, the Controller 20 runs a status check which looks at the position of the Master Switch 30, checks the voltage values for $V_{BAT}$, $V_{OUT}$, and $V_{KEY}$ and then runs a current calculation to determine the status of battery charging.

The Contactor Closed Routine starts when the "contactor" is sensed to be closed by the EBC Controller 20. The program steps are similar to the Contactor Open Routine, starting with the same program steps, which are as follows:

Contractor Closed Routine
1. If contactor is CLOSED then
1.1 Start Exec_Timer (for predetermined time period)
1.2 Run Master Switch Routine
1.3 Run Input Voltages Routine The next step is a Current Calculation Routine that is based upon the detected voltages at different points in the vehicle electrical circuit. The program steps are as follows:

Current Calc Routine

| | |
|---|---|
| 1. If $(V_{OUT} - V_{KEY})$ > Predetermined value<br>Or $V_{OUT}$ > Vbat charging<br>  Set I_Out_Charging = 1<br>  Else Reset I_Out_Charging = 0 | Alternator out threshold<br>Alternator is charging |
| 2. If $(V_{OUT} - V_{KEY})$ > Predetermined value<br>Or If $V_{OUT}$ > Predetermined value<br>  Set I_Out_Over_Charge = 1<br>  Else Reset I_Out_Over_Charge =0 | Overcharge condition<br>Overcharge condition |
| 3. If $(V_{OUT} - V_{KEY})$ < Predetermined value<br>  Set I_Out_Discharge = 1<br>  Else Reset I_Out_Discharge = 0 | Battery discharge normal |
| 4. If $(V_{OUT} - V_{KEY})$ > Predetermined value<br>  Set I_Out High = 1<br>  Else Reset I_Out High = 0 | Discharge above threshold |
| 5. If $(V_{OUT} - V_{KEY})$ > Predetermined value<br>  Set I_Out_Start = 1<br>  Run Start Routine<br>  Else Reset I_Out-Start = 0 | Start Mode or Short<br>Verify Start Mode or Short |
| 6. End Current Calc Routine | |

The current calculation comprises the checking of the difference of $V_{OUT}$ versus $V_{KEY}$. The output of the alternator 18 is sufficient to charge the battery 12 when the voltage values for $V_{KEY}$ less the voltage value for $V_{OUT}$ is greater than a predetermined voltage characteristic of the battery type and specific vehicle electrical system. If the calculated voltage is above the predetermined value then the alternator 18 is properly working. A second current sense calculation is undertaken to determine overcharging of the battery 12. If the voltage value of $V_{OUT}$ less the voltage value for $V_{KEY}$ is greater than a preset negative voltage or, if $V_{OUT}$ is greater than a predetermined value, then an overcharge situation exists. The EBC Controller also checks the battery 12 discharge rate by calculating the difference between the voltage value for $V_{OUT}$ and $V_{KEY}$ and determining whether this result is greater or less than 1.0 v. If the result of the calculation is less than 1.0 v., then the battery is discharging normally. However, if the result is greater than 1.0 v., the battery is discharging above an acceptable threshold. If an above threshold discharge is detected and the result of the calculation is greater than a predetermined value, then the EBC Controller 20 will conduct a start test routine to determine whether the vehicle is in start mode or there is a short circuit.

If the difference between $V_{OUT}$ and $V_{KEY}$ is greater than a predetermined minimal voltage difference, then the Start Routine is called to initiate the vehicle engine start and/or determine whether a short circuit or other anomaly exists. The program steps are as follows:

Start Routine
1. If I_Out_Start=1 then
Run Start_Timer (or increment)
Else Reset Start_Timer=0
If Start_Timer=(preset time) seconds then
Set Start_Timeout=1
Set Fault=1
1.1 Short Circuit Routine
If I_Out_High=1
Or I_Out_Start=1
Or V_Out_Fault=1 then
  Set Short_Circuit=1
  Else Reset Short_Circuit=0
1.2 Charge Limit Routine
If I_Out_Charge=1
Increment Over_Charge_Timer
Else Reset I_Out_Over_Charge_Timer
If    I_Out_Over_Charge_Timer>Over_Time_Charge_Timeout then
Set Soft_Fault=1
Else Reset Over_Charge_Timer
1.3 Low Battery Routine
If V_Bat>10.2 volts then
  Set V_Bat_Low=1
  Else Reset V_Bat_Low=0

During the start/short circuit test high current is allowed for a set period of time. If the high current is still present at the end of the period contactor 14 is opened. The contactor 14 will remain open until the key switch 22 is turned OFF and then back ON. If a short circuit occurs in the key switch circuit which caused the high current fault, then the resistance check will not see a change in resistance and the contactor 14 will not reclose. The start/short circuit test is initiated when the result of the calculation of the difference between the voltage value for $V_{OUT}$ and $V_{KEY}$ being greater than 1.5 v. A short circuit is determined based upon the results of calculated voltage values detecting a high current where the difference between the voltage value for $V_{OUT}$ and $V_{KEY}$ being greater than 1.0 v., or the same voltage values being greater than 1.5 v., or if $V_{OUT}$ is less than $V_{BAT}$ minus 1.0 v. If any of these conditions are detected, then the EBC Controller 20 notes the detected short circuit and continues with determining charging limitations. If the difference between $V_{OUT}$ and $V_{KEY}$ is greater than a negative preset voltage value or if $V_{OUT}$ is greater than a predetermined value based upon battery type and vehicle electrical system then an incremental step is made to the overcharge timer and this timer is checked against the value for the over time charge timeout. Unless the timeout is exceeded, no fault is detected. In the event of a time out default, the default is noted by the EBC Controller 20. Finally, the Controller 20 queries the battery charge to determine whether the voltage level is adequate to start or restart the vehicle. The voltage level for $V_{BAT}$ is detected and compared to a preset voltage value such that if $V_{BAT}$ is less than low voltage constant the Controller determines that the battery charge is low.

With the completion of the start/short circuit test, the current calculation is also completed and the EBC Controller 20 returns to the contactor closed status check by checking the fault status and causing the detected faults or normal operating conditions to be displayed on Lamp L1, 32, and Lamp L2, 34, respectively. The Fault Status Routine and the LED Routine are performed as described above. The Controller 20 then returns to monitoring the contactor 14 until a shutdown is detected by a change in the $V_{KEY}$ voltage level as the key switch 22 is turned OFF.

The EBC Controller 20 also monitors the vehicle data links through the bi-directional cables SAE J1939 and SAE J1708 to take advantage of sensed and detected data relevant to vehicle motion, engine compartment overheating, smoke and fire detection, etc. Each of these ports constitutes serial communication with vehicle data related to a variety of events such as, but not limited to, crash impact, rollover, smoke in drive compartment, fire in engine compartment, etc. The EBC Controller 20 also broadcasts on the available communication port pertinent information concerning the status of the vehicle electrical system and fault conditions relevant to diagnostics and prognostics of the electrical system. In the event of an accident, sensed as an almost instantaneous forward motion stoppage or a rollover, the Controller 20 can initiate a contactor 14 OPEN condition shutting off all electrical power to the vehicle to prevent explosion, fire, or further spread of a vehicle fire. Otherwise the EBC Controller 20 gathers additional information through the data links and can store this information in a Fault Log or other data storage location. The additional communication port denominated as the Wireless Module 28 serves as another communications pathway for accessing or sending data to and from the Controller 20. The Wireless Module may be conformed to operate with the Bluetooth® Specification and Protocol using the ISM radio frequency band or just be a designated rf communications pathway for limited range radio communication between paired transceivers.

Upon the occurrence of the detection of a key switch 22 OPEN condition, a modifiable time period is set, e.g., 15 minutes, for the data logging of the on-board devices to be completed prior to the automatic shutdown of the Master Switch 30 by the Controller 20 by changing the MS2 value from 1 to 0 indicating that the electrical systems of the vehicle are shutdown. The delay shutdown time period may be indicated by visual indication utilizing the Lamps L1 and L2, 32, 34, respectively, and may also provide a warning or alarm to the operator through an audible device. During the shutdown time period, any number of data links can be accessed by wire or wirelessly to transmit collected vehicle information to external data storage locations. In addition, certain diagnostics can be performed to evaluate vehicle performance and this information may also be transmitted to external storage locations. Finally, following the delay shutdown time period, the Master Switch 30 can be manually disengaged, but this is unnecessary with the EBC Controller 20 resetting the Master Switch 30 status automatically which shuts down all electrical systems on the vehicle by opening the contactor 14.

As described above, the Intelligent Battery Disconnect (IBD) is an electronically controlled battery contactor designed for motor vehicles that utilize storage batteries for starting, lighting and other electrical devices. The IBD opens (disconnects) or closes (connects) the battery circuit based on electronic intelligence derived from monitoring the electrical system voltages and currents of certain designated devices necessary for starting and maintaining electrical operation of the vehicle. The IDB also communicates with other on-board control units and pre-programmed requirements specific to the vehicle operation for deriving information and date about vehicle operation and for logging events detected by the IDB as part of its vehicle electrical system monitoring.

The primary functions of the IBD are to protect the battery from excessive current drain when the vehicle is parked, protect against short circuits across the main electrical feed, and to provide emergency electrical system disconnect in the event of a vehicle impact, rollover or any sensed thermal events. The IBD continually monitors the vehicle electrical system health and provides electronic data for condition-based maintenance. This provides the maintenance shop vital diagnostic and prognostic information about the battery, starting and charging systems.

The IBD also has a unique feature to monitor the key or ignition switch closure. This allows for complete transparency such that the vehicle operator is not required to do anything other than the normal use of the key. Another IBD feature includes a programmed delay function that controls the opening of the contactor that works in conjunction with other electronic control units that may require electrical power for a period of time after vehicle shutdown. A master electrical system disconnect switch is also provided for manual override for use in servicing the vehicle or during an emergency.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

The invention claimed is:

1. A battery disconnect apparatus for monitoring and controlling the battery to electrical load circuit completion or interruption based upon vehicle electrical system states comprising:
    a battery for supplying electrical power to the vehicle circuits;
    an alternator to maintain electrical power while the engine is operating and to recharge the battery;
    a key switch for initiating the starting of the vehicle engine and completing the electrical circuits to switched electrical vehicle loads;
    a battery contactor interposed in the vehicle electrical system between the battery and the vehicle electrical devices and loads, including switched and unswitched electrical loads; and
    a controller module for sensing the state of the battery contactor and sensing the state of the key switch by initiating a voltage pulse through the voltage output of the battery contactor and sensing and comparing the voltage input from the key switch and issuing electrical control signals to the battery contactor to close upon sensing key closure.

2. The vehicle electrical system monitoring apparatus of claim 1 further comprising a master vehicle electrical system switch having a first manual control state for disconnecting the vehicle electrical circuits from the battery and a second automatic control state connected to said controller module, said controller module being capable of detecting and determining the state of the master switch for automatic operation of the vehicle electrical system.

3. The vehicle electrical system monitoring apparatus of claim 1, wherein said controller module further senses electrical system faults by continually monitoring vehicle electrical system voltages and currents by comparing battery voltage with voltage output of the battery contactor and the key switch against predetermined voltage values and constants including low battery charge, battery overcharging, normal battery charging, low battery voltage and electrical system short circuit.

4. The battery disconnect apparatus of claim 1, wherein said controller module further provides a timed delay of electrical system shut down by delaying the opening of said battery contactor by predetermined conditions or time period after sensing a key switch open condition.

5. The battery disconnect apparatus of claim 1, wherein said controller module maintains at least one communications link with another vehicle data collection device to share vehicle status information and data, to store or log vehicle information status or data on said another vehicle data collection device, said communication link being wired or wireless.

6. The battery disconnect apparatus of claim 1, wherein said controller module further records certain electrical faults and provides a fault status indication as well as logging such fault or status internally and for communicating such fault or status to other on-board or external data collection devices.

7. The battery disconnect apparatus of claim 1, wherein said controller module continually monitors data received from at least one other on board data collection device concerning vehicle status and responds to detected vehicle fault conditions including impact, rollover, engine compartment smoke or fire, operator compartment smoke or fire, and electrical system fault by automatically initiating vehicle electrical system shut down by opening the battery contactor disconnecting the battery from the electrical system.

8. The battery disconnect apparatus of claim 2, wherein said master switch being switched to said first manual state permits the operator to manually override automatic control opening the battery contactor to disable the vehicle electrical system and being switched to said second automatic control state permits the operator to initiate or resume automatic control of the vehicle electrical system.

9. The battery disconnect apparatus of claim 1, wherein said controller module in initiating battery disconnect will provide an alarm to the vehicle operator that may be visual, audible, or both.

10. A method for monitoring and controlling the battery to electrical load circuit completion or interruption based upon vehicle electrical system states comprising the steps of:
providing a battery contactor interposed in the vehicle electrical system between the battery and the vehicle electrical devices and loads, including switched and unswitched electrical loads;
providing a key switch for initiating the starting of the vehicle engine and completing the electrical circuits to switched electrical vehicle loads;
providing a controller module for sensing the state of the battery contactor and sensing the state of the key switch;
determining the open/closed status of the battery contactor;
if the battery contactor is determined to be open, periodically initiating a voltage pulse through the voltage output of the battery contactor and sensing and comparing the voltage input from the key switch; and,
issuing electrical control signals to the battery contactor to close upon sensing key closure creating a closed circuit between the battery and the vehicle electrical devices and loads.

* * * * *